United States Patent [19]
Sutton et al.

[11] 3,829,724
[45] Aug. 13, 1974

[54] IMPROVEMENTS IN OR RELATING TO AN ELECTRIC GENERATOR WITH ADJUSTABLE ECCENTRIC MEMBER FOR VARYING THE OUTPUT VOLTAGES

[75] Inventors: Michael Gilbert Sutton; Michael Edward Gailes, both of Peterborough, England

[73] Assignee: British Domestic Appliances Limited, Peterborough, England

[22] Filed: Aug. 14, 1973

[21] Appl. No.: 388,200

[30] Foreign Application Priority Data
Aug. 16, 1972 Great Britain .................... 38147/72

[52] U.S. Cl. ........................................... 310/67 R
[51] Int. Cl. ......................................... H02k 11/00
[58] Field of Search ........... 310/75 R, 67 R, 82, 85, 310/89, 91, 111, 166, 168, 169, 170, 171

[56] References Cited
UNITED STATES PATENTS

| | | | |
|---|---|---|---|
| 2,719,930 | 10/1955 | Lehde | 310/111 |
| 3,147,425 | 9/1964 | Christoff | 310/111 X |
| 3,562,741 | 2/1971 | McEvoy et al. | 310/111 X |
| 3,668,447 | 6/1972 | Hayasaka | 310/166 |
| 3,739,211 | 6/1973 | Hasler | 310/168 |

*Primary Examiner*—A. D. Pellinen
*Attorney, Agent, or Firm*—Kirschstein, Kirschstein, Ottinger & Frank

[57] ABSTRACT

A tachogenerator, for use for example, in motor speed control circuits, comprising a rotatable permanent magnet, a stationary coil spaced from the magnet, and an annular member of magnetic material disposed eccentrically with respect to the axis of rotation of the magnet and formed with at least one projection which extends into the space between the magnet and the coil for forming a path for magnetic flux coupling with the coil, the position of the projection being adjustable, for example by incremental angular movement of the annular member, so as to vary the output voltage from the coil for a given speed of rotation of the magnet.

10 Claims, 4 Drawing Figures

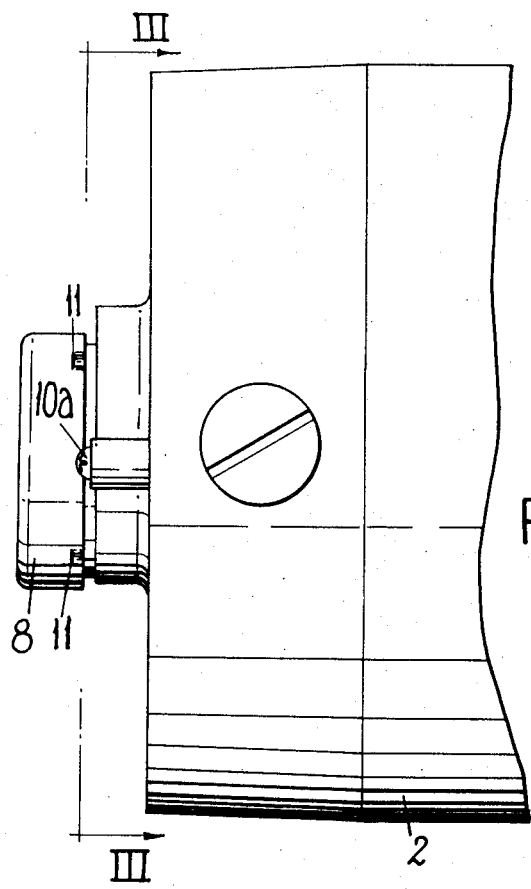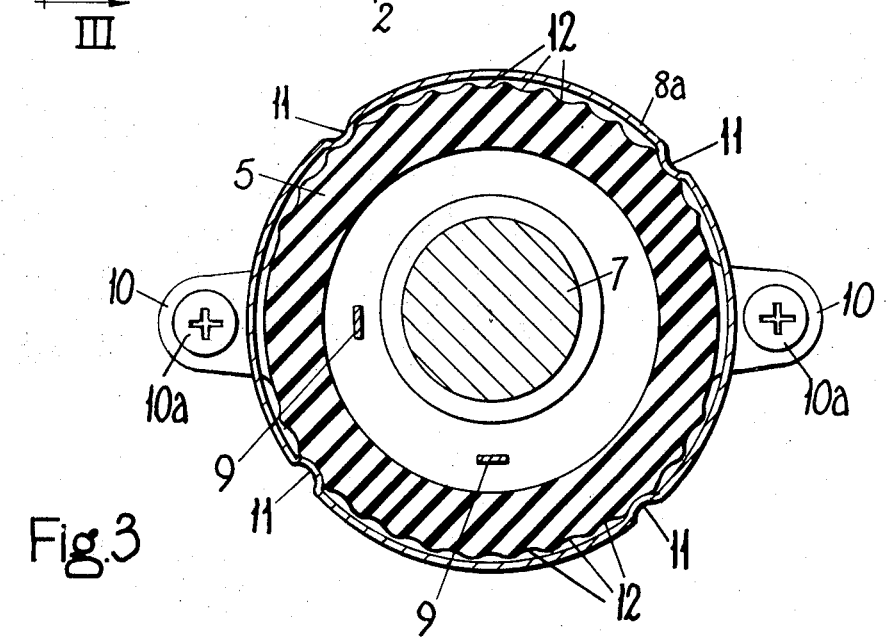

IMPROVEMENTS IN OR RELATING TO AN ELECTRIC GENERATOR WITH ADJUSTABLE ECCENTRIC MEMBER FOR VARYING THE OUTPUT VOLTAGES

This invention relates to electric generators and more particularly to tachogenerators for use in motor speed control circuits.

In motor speed control circuits tachogenerators are usually employed to provide a signal proportional to the rotational speed of the motor, which signal is compared in a regulator with a reference signal and in some cases a further signal proportional to the load on the motor, to derive a correction signal which is applied to the motor to adjust the speed thereof, until the output of the generator is such as to produce no correction signal from the regulator. By adjustment of the voltage output of the generator, for a given motor speed, it will be seen that the speed of the motor can be controlled.

In a known construction of a generator having a permanent magnet rotor, a horseshoe-shaped magnetic yoke magnetically coupled therewith and having a coil wound thereon, adjustment of the voltage output is achieved by providing a magnetic shunt between the legs of the yoke and adjusting the shunt by screwing means which varies the air gap between the legs. Such a construction is complicated and requires the use of special tools to carry out the adjustment.

According to the present invention there is provided an electric generator comprising a rotatable permanent magnet, a stationary coil spaced from the magnet, and an annular member of magnetic material disposed eccentrically with respect to the axis of rotation of the magnet and formed with at least one projection which extends into the space between the magnet and the coil for forming a path for magnetic flux coupling with the coil, the position of the projection being adjustable so as to vary the output voltage from the coil for a given speed of rotation of the magnet. The coil may also be disposed around the magnet eccentrically with respect to the axis thereof.

The or each projection preferably forms an integral part of the annular member and is adjustable in position by adjusting the position of the member itself.

Preferably the coil is coaxial with the annular member which is conveniently rotatably adjustable about its own axis. Because of the eccentricity of the annular member with respect to the axis of rotation of the magnet, angular movement of the annular member about its own axis will cause a variation in the width of the air gap between the or each projection formed on the annular member and the magnet which will thereby change the proportion of the magnet's flux linking with the coil, and thus vary the output voltage. Conveniently the coil surrounds the rotatable magnet and is generally co-planar therewith, and the or each projection extends axially into the space between the magnet and the coil.

The generator may be mounted on an electric motor so as to act as a tachogenerator giving an output voltage which is dependent upon the speed of the motor, which output voltage may be fed to a control circuit for controlling the motor speed according to known techniques, the magnet being secured to the motor shaft and the coil to the body of the motor.

Preferably the magnet is a multi-polar edge magnetised disc or annulus which may be removably secured to the shaft of a motor such that it may readily be replaced by other magnets having different numbers of poles.

In a preferred embodiment of the invention, the coil is wound on an annular bobbin of insulating material formed with undulations around its periphery, and the annular member is formed with an annular flange around its outer circumference which surrounds the coil and is provided with indentations which engage the undulations in the bobbin, whereby the angular position of the annular member relative to the bobbin may be adjusted in a stepwise fashion. Such adjustment will vary the width of the air gap between the projections formed on the annular member and the magnet as above described.

An annular disc of magnetic material whose variation in permeability with temperature is inversely proportioned to that of the magnet, may be provided adjacent thereto in order to compensate for variation in the magnetic flux of the magnet due to changes in temperature.

The invention is of particular value when fitted to an electric motor for use as a tachogenerator for giving an output proportional to the speed of rotation of the motor shaft, and in order that the invention may be more clearly understood such a generator according to the invention will now be described by way of example with reference to the accompanying drawings, of which:

FIG. 2 is a side view of the generator and part of the associated motor;

FIG. 3 is an enlarged sectional end view along the line III—III of FIG. 2 of the generator including an adjusting means; and, FIG. 4 shows an enlarged sectional side view of the generator with the adjusting means, along the line IV—IV of FIG. 1.

Figure 1:
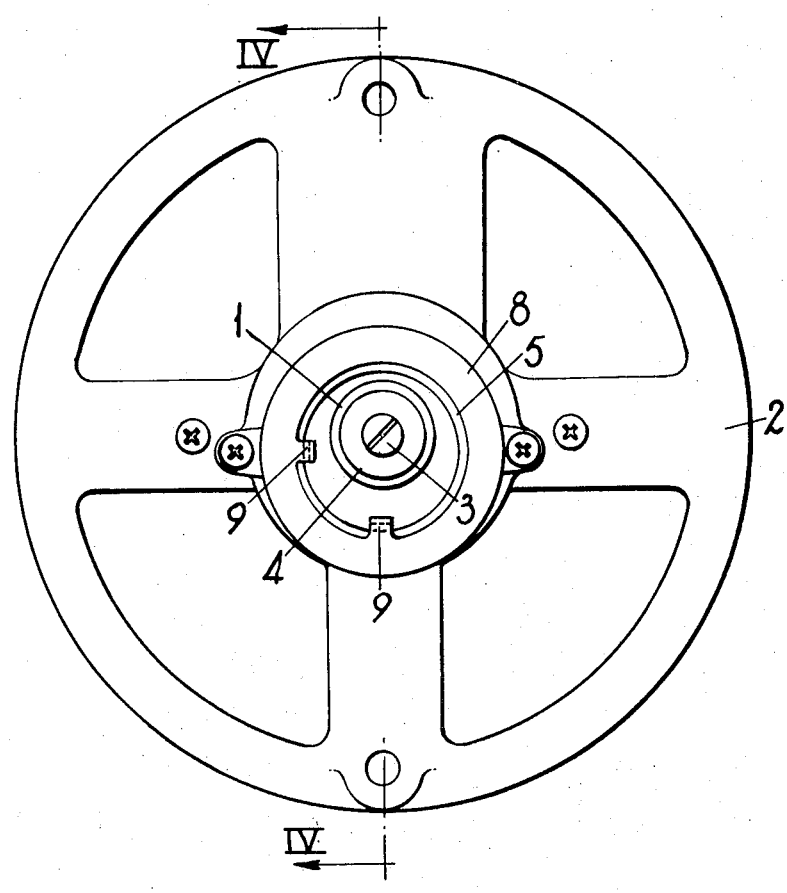
FIG. 1 is an end view of a motor fitted with the generator.

Referring to the drawings the generator comprises a multi-polar edge magnetised disc magnet 1, typically of barium ferrite sintered material, removably secured by means of a screw and overlying washer 4, to the shaft of a motor 2, which may be a D.C. motor used for driving the clothes containing drum of a washing machine. A bobbin 5 of insulating material is wound with a coil 6 of fine gauge copper wire and is mounted at one end of the body of the motor 2 so as to be eccentric with respect to the motor shaft 7, with the magnet arranged to rotate within the width of the coil. The bobbin 5 is provided with two diametrically opposed apertured flanges 10 whereby it is secured to the body of the motor 2 by screws 10a as shown or by other suitable fixing means.

An annular steel cover member 8, formed around its outer periphery with an axially extending cylindrical flange 8a, encloses the coil 6 and forms a flux guide. The radially inner periphery of the annular member 8 is formed with two projections 9 which extend axially into the airgap between the magnet 1 and the bobbin 5.

Referring to FIG. 3, the flange 8a is formed with two pairs of diametrically opposed indentations 11 equally spaced around the periphery of the flange, which engage undulations 12 provided around the periphery of the bobbin 5 and hold the annular cover in any set angular position. A peripheral ridge 11a adjacent the undulations 12 on the bobbin serves to secure the cover against axial displacement when fitted to the bobbin, the free edge of the flange 8a, being chamfered to enable the cover to be fitted to the bobbin by sliding the flange 8a axially over the ridge until the undulations 11 clip behind the ridge 11a and engage the undulations 12.

The engagement between the cover 8 and bobbin 5 is such that incremental adjustment of the position of the two projections 9 in the airgap between the magnet 1 and bobbin 5 can be achieved by step-wise rotation of the annular cover 8 relative to the bobbin.

It will be understood that the number of projections 9 may be altered up to a maximum equal to the number of pole pairs on the magnet less one. If the number of projections 9 is greater than one they are each spaced apart at twice the magnetic pole pitch. In the embodiment shown, the multi-pole edge magnetised disc magnet 1 has four pole pairs and the annular cover 8 is provided with two projections 9 spaced apart at 90°.

Consider now the operation of the generator. When the magnet is stationary and in a position such that two of the north poles of the magnet 1 coincide with the two projections 9, the magnetic flux path extends across the airgaps between the magnet 1 and the projections 9, along the projections, over the annular cover 8 and back to the south poles on the magnet through the airgap between the annular cover 8 and the magnet 1, thereby linking the coil 6 with a proportion of the magnetic flux.

Consider now rotation of the magnet 1. As the shaft 7 of the motor 2 rotates, alternate north and south poles of the magnet 1 will pass the projections 9, causing a sinusoidal variation in the magnetic flux linking the coil 6 thereby inducing a sinusoidal voltage therein. Since the rate of change of flux linking the coil 6 will determine the voltage output of the generator, an increase in the rotational speed of the shaft and hence the magnet will result in an increase in the output voltage and frequency.

If the annular cover 8 is now rotated, the effective airgap between the magnet 1 and the projections 9 will be altered, due to the eccentricity of the stator structure relative to the axis of rotation of the magnet, which will result in a change in the proportion of magnetic flux linking the coil 6 and hence in the voltage output of the generator, for a given speed of rotation of the shaft.

Figure 4:
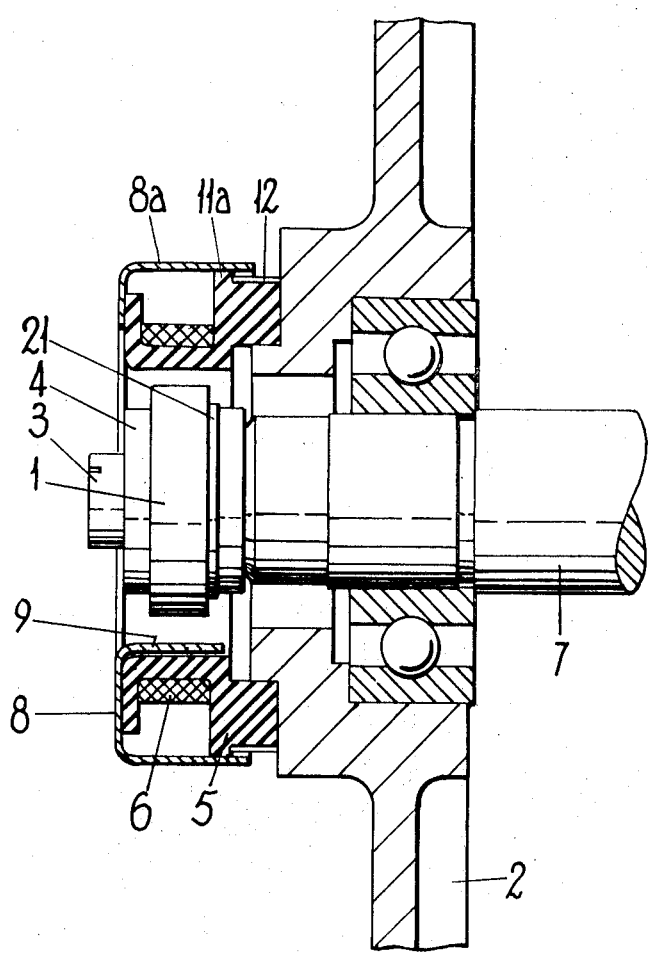

A metal disc 21 (FIG. 4), for example of high nickel content, which has a variation of magnetic permeability with temperature which is inversely proportional to that of the permanent magnet 1 is mounted adjacent to the magnet within the flux path and acts as a temperature compensating device for the magnet 1.

It will be seen that a generator according to the invention is of cheap and simple construction and may be readily adjusted manually without the need for special tools. However, in providing a cheap and simple construction, the normal output of the generator, at a given speed of rotation of the magnet, will vary from one unit to another due to, for example, different magnetic pole strengths, variation in the number of turns in the coil and different relative positions of the various parts, but the simple means of adjustment enables the voltage output to be readily corrected to the required level in order to overcome these differences without the need for special tools.

A number of factors affect the output of a generator according to the invention for a given motor speed in conjunction with the range of adjustment and these can be listed as follows:

1. For a given degree of eccentricity of the annular member with respect to the magnet, size of magnet, coil size, number of coil turns and axial position of magnet, an increase in the number of projections increases the effective output but reduces the range of adjustment. Likewise a decrease in the number of projections reduces the effective output but increases the range of adjustment.

2. Assuming all other factors fixed, an increase in the degree of eccentricity of the annular member with respect to the magnet increases the range of adjustment.

3. Again, with all other factors fixed, an increase in the average airgap between the projections and magnet reduces the effective output.

A nominal axial magnet position can be found about which small axial movements make little difference to the output but are sufficient to take into account any build-up of tolerance in the motor.

The construction is such as to be symmetrical with respect to the motor shaft and hence the same output will result in both directions of rotation.

Any stray magnetic flux will cut the coil on both sides and hence no variation in output voltage occurs.

A generator constructed in accordance with the invention is of particular value when used as a tachogenerator in the control circuit of a washing machine drive motor, as adjustment of the voltage output of the generator, and hence of the speed of the drive motor may be carried out in the confined space of the washing machine.

In the particular embodiment described above, the motor 2 may be a D.C. motor used for driving the clothes containing drum of a so-called horizontal (axis) washing machine. In practice the drum load will vary due to such factors as the weight of clothes and their distribution around the drum and therefore the speed of the motor will tend to rise and fall according to the degree of load imposed on it. Obviously if this were allowed to happen the performance of the machine would not be acceptable and it follows that to achieve an optimum wash and spin performance the speed of the drum must be maintained at a constant level under all conditions. This can be achieved by varying the applied voltage to the motor so that if, for example, the load increases then the voltage must be increased proportionally to maintain its speed. Such voltage control can be effected by a solid state control circuit and a tachogenerator feedback system.

The tachogenerator is fitted to the motor so as to be driven by the motor shaft and gives a low voltage A.C. output. The voltage is rectified and smoothed within a control module to give a D.C. output which is proportional to the motor speed. The negative feedback (about 2.5 volts) is not sufficient on its own to control motor speed so a further feedback is obtained from the motor current which is proportional to the load in the drum. It is arranged for the modular speed controller to compare the two feedback outputs with fixed voltage and to use the difference between them to control the amount of current passing through a thyristor associated with the motor control circuit. Thus, were the fixed voltage to be applied to the motor at a given speed, without load, and a load then applied, the motor would start to slow down and the tachogenerator output would decrease. At the same time the motor current would increase due to the applied load and the positive or current feedback would increase also. By comparing the differences between the negative feedback, the current feedback and the fixed voltage the thyristor would be made to conduct more current thus causing the motor to return to its correct speed.

The construction adopted enables the magnet 1 and cover member 8 to be readily replaced by another magnet and member having different numbers of poles and projections to suit different operating conditions.

It will be appreciated that while the invention has been described in its preferred application to a radial air gap generator, it may also be applied with advantage to a planar air gap generator in which the or each projection provided on the annular member extends radially into the air gap between the magnet and the coil and in which adjustment of the annular member changes the radial position of the or each projection to vary the output voltage of the coil.

We claim:

1. An electric generator comprising in combination a rotatable permanent magnet; a coil surrounding but spaced from the magnet; a normally stationary annular member of magnetic material disposed eccentrically with respect to the axis of rotation of the magnet; at least one projection formed on the annular member and extending into the space between the magnet and the coil for forming a path for magnetic flux coupling with the coil such as to produce a voltage output from the coil upon rotation of the magnet; and means for selectively altering the position of the or each projection to thereby vary the output voltage from the coil for a given speed of rotation of the magnet.

2. An electric generator according to claim 1, wherein the coil is disposed eccentrically with respect to the axis of rotation of the magnet.

3. An electric generator according to claim 2, wherein the coil is coaxial with the annular member.

4. An electric generator according to claim 1, adapted in use to give a voltage output dependent upon the rotational speed of the shaft of a motor, wherein the magnet is secured to the end of the motor shaft and the coil is mounted on the body of the motor.

5. An electric generator according to claim 1 wherein the magnet is a multi-polar edge magnetised disc or annulus and is readily removeable to facilitate its replacement with another having a different number of poles.

6. An electric generator according to claim 5 wherein the magnet is provided with four pole pairs and the annular member is formed with two projections spaced apart at an angle of 90° with respect to the axis of the annular member.

7. An electric generator comprising in combination a rotatable permanent magnet; a coil surrounding but spaced from the magnet; a normally stationary annular member of magnetic material disposed eccentrically with respect to the axis of rotation of the magnet; at least one projection forming an integral part of the annular member and extending into the space between the magnet and the coil for forming a path for magnetic flux coupling with the coil such as to produce a voltage output from the coil upon rotation of the magnet; and means for selectively altering the position of the annular member and hence of the or each projection to thereby vary the output voltage from the coil for a given speed of rotation of the magnet.

8. An electric generator according to claim 7 wherein the annular member is adjustable, for selectively altering the position of the or each projection, by rotation about its axis.

9. An electric generator according to claim 8, wherein the coil surrounds the rotatable magnet and is generally co-planar therewith, and the or each projection extends axially into the space between the magnet and the coil.

10. An electric generator according to claim 8 wherein the coil is wound on an annular bobbin of insulating material formed with undulations around its periphery, and the annular member is formed with an axially extending flange which surrounds the coil and is provided with indentations which resiliently engage the undulations in the bobbin whereby the angular position of the annular member relative to the bobbin is adjustable in a stepwise fashion.

* * * * *